(12) United States Patent
Iida

(10) Patent No.: US 8,010,409 B2
(45) Date of Patent: Aug. 30, 2011

(54) ARTICLE SALES DATA PROCESSING APPARATUS

(75) Inventor: Yuji Iida, Izu (JP)

(73) Assignee: Toshiba Tec Kabushiki Kaisha (JP)

( * ) Notice: Subject to any disclaimer, the term of this patent is extended or adjusted under 35 U.S.C. 154(b) by 0 days.

(21) Appl. No.: 11/975,338

(22) Filed: Oct. 18, 2007

(65) Prior Publication Data

US 2008/0082423 A1 Apr. 3, 2008

Related U.S. Application Data

(63) Continuation of application No. PCT/JP2007/053190, filed on Feb. 21, 2007.

(30) Foreign Application Priority Data

Feb. 21, 2006 (JP) ................. 2006-043995

(51) Int. Cl.
*G06Q 20/00* (2006.01)
(52) U.S. Cl. ............. 705/17; 705/16; 705/23; 705/27.1; 705/27.2
(58) Field of Classification Search ...................... 705/17
See application file for complete search history.

(56) References Cited

U.S. PATENT DOCUMENTS

| | | | | |
|---|---|---|---|---|
| 5,609,223 | A * | 3/1997 | Iizaka et al. ..................... | 186/61 |
| 5,640,002 | A * | 6/1997 | Ruppert et al. .......... | 235/462.46 |
| 6,809,645 | B1 * | 10/2004 | Mason ....................... | 340/572.1 |
| 2002/0011933 | A1 * | 1/2002 | Andersen et al. .......... | 340/572.1 |
| 2002/0170961 | A1 * | 11/2002 | Dickson et al. ............... | 235/383 |
| 2005/0187819 | A1 * | 8/2005 | Johnson ........................... | 705/14 |
| 2007/0228678 | A1 * | 10/2007 | Solomon et al. .......... | 280/33.992 |
| 2008/0074239 | A1 * | 3/2008 | Usami .......................... | 340/10.4 |

FOREIGN PATENT DOCUMENTS

| | | |
|---|---|---|
| JP | 04074300 A | 3/1992 |
| JP | 4-302087 | 10/1992 |
| JP | 10-162247 | 6/1998 |
| JP | 2002-008143 | 1/2002 |
| JP | 3373860 | 11/2002 |
| JP | 3373860 B | 11/2002 |
| JP | 3607341 | 10/2004 |
| JP | 2005-141374 | 6/2005 |

OTHER PUBLICATIONS

International Preliminary Report on Patentability dated Sep. 4, 2008 regarding PCT/JP2007/053190.
International Search Report for PCT/JP2007/053190.

* cited by examiner

*Primary Examiner* — F. Ryan Zeender
*Assistant Examiner* — Fateh M Obaid
(74) *Attorney, Agent, or Firm* — Harness, Dickey & Pierce, P.L.C.

(57) ABSTRACT

An article sales data processing apparatus has an electronic tag data memory and an article item buffer. In the case where the same data as electronic tag data read by an electronic tag reader is not stored in the electronic tag data memory, the read electronic tag data is added to the electronic tag data memory. When the operating mode is switched to the cancel mode, data in the electronic tag data memory is cleared. In the case where the input mode is selected, article sales data is acquired based on the electronic tag data added to the electronic tag data memory and the acquired article sales data is added to an article item buffer. In the case where the cancel mode is selected, the article sales data acquired based on the electronic tag data added to the electronic tag data memory is deleted from the article item buffer.

4 Claims, 5 Drawing Sheets

| Article code | Article name | Unit price | Number of sales | Sales amount | Cancel |
|---|---|---|---|---|---|
|  |  |  |  |  |  |
|  |  |  |  |  |  |
|  |  |  |  |  |  |
|  |  |  |  |  |  |
| ⋮ | ⋮ | ⋮ | ⋮ | ⋮ |  |
|  |  | Summation |  |  |  |

| No | Electronic tag data |
|---|---|
| 1 |  |
| 2 |  |
| 3 |  |
| 4 |  |
| ⋮ | ⋮ |
| N |  |

ARTICLE SALES DATA PROCESSING APPARATUS

CROSS REFERENCE TO RELATED APPLICATIONS

This is a Continuation Application of PCT Application No. PCT/JP2007/053190, filed Feb. 21, 2007, which was published under PCT Article 21(2) in Japanese.

This application is based upon and claims the benefit of priority from prior Japanese Patent Application No. 2006-043995, filed Feb. 21, 2006, the entire contents of which are incorporated herein by reference.

BACKGROUND OF THE INVENTION

1. Field of the Invention

The present invention relates to an article sales data processing apparatus which performs short-range communication using electromagnetic waves with an electronic tag attached to each article to read data from a memory of each electronic tag in a non-contact manner and, based on the data read from each electronic tag, processes sales data of each article sold in one transaction.

2. Description of Related Art

Today, in the retail industry who sells articles at retail to consumers, a checkout system using an electronic tag is developed. In this system, an electronic tag is attached to articles processed at a checkout counter in sales unit.

The electronic tag is a device including a pair of an antenna and an integrated circuit (IC) chip (packaged semiconductor integrated circuit) and formed into a tag or label. The IC chip of the electronic tag is composed of a controller and a memory. In the memory of the electronic tag, an identification (ID) code assigned for identifying each tag itself is recorded.

Further, in the memory of the electronic tag attached to each article, an article code for identifying the type of each article to which the electronic tag is attached is stored. The electronic tag storing the article code in its memory is sometimes referred to as "article tag".

The electronic tag data such as the ID code and article code stored in the memory of the electronic tag is processed in an article sales data processing apparatus such as a point-of-sales (POS) terminal. The article sales data processing apparatus is provided with an electronic tag reader for reading the electronic tag data from the electronic tag. Data communication using electromagnetic waves is performed between the electronic tag reader and electronic tag. The antenna of the electronic tag reader is provided on a checkout counter on which articles to be bought by a customer are placed.

When a customer places articles on the checkout counter, electronic tag data is read from the electronic tag attached to each article by the electronic tag reader. The read electronic tag data is sent to the article sales data processing apparatus. Based on the received electronic tag data, the article sales data processing apparatus processes sales data of the relevant article.

Even if any object is interposed between the electronic tag attached to the article and antenna of the electronic tag reader in such an article sales data processing apparatus, the electromagnetic wave passes through the interposed object to allow the read operation of the electronic tag data. Therefore, it is not necessary to have the electronic tags attached to respective articles face, one by one, the antenna of the electronic tag reader, unlike a conventional technique in which a combination of a barcode and barcode reader is used. That is, simply by placing each article to which the electronic tag is attached within the communication area of the electronic tag reader, acquisition of the data concerning the article can be completed, thereby significantly increasing the efficiency of checkout operation.

Further, it is possible to read even a plurality of electronic tags at once as far as they are located within the communication area of the antenna. This allows simultaneous processing of sales data of a plurality of articles.

However, the tag data can be read repeatedly from the electronic tag located within the communication area of the antenna. Therefore, it is necessary to prevent the article sales data processing apparatus from redundantly processing the sales data of the article to which the electronic tag whose data has already been read is attached.

To this end, it is necessary to sort out the electronic tag data of the electronic tag whose data has not yet been read from the electronic tag data of the electronic tag whose data has already been read.

An article sales data processing apparatus configured to prevent duplicate reading of the data of the electronic tag attached to the same article is disclosed in Japanese Patent No. 3373860. This article sales data processing apparatus has a memory area for temporarily storing a pair of an article code and serial number obtained from the same electronic tag data. Different serial numbers are respectively allocated to articles having the same article code. Accordingly, a pair of the article code and serial number differs from one article to another.

Every time a controller of the article sales data processing apparatus receives the electronic tag data from the electronic tag reader, it determines whether the article code and serial number in the received electronic tag data have already been stored in the memory area. In the case where a pair of article code and serial number corresponding to both the article code and serial number in the received electronic tag data has already been stored in the memory area, the received electronic tag data is discarded. Otherwise, a pair of article code and serial number in the received electronic tag data is stored in the memory area.

In this manner, the article sales data processing apparatus processes sales data corresponding to one transaction based on the article codes and serial numbers stored in the memory area.

The data that have been stored in the memory area are retained until the sales data corresponding to one transaction have been processed. After completion of termination processing of one transaction, the memory area is cleared for preparation of the next transaction.

However, in the case where the condition of electronic tag is not changed between the article after payment and article before payment, the data stored in the memory area are retained until the tag-attached articles in an effective state go out of the communication area of the antenna. This prevents the sales data of the articles of another customer after payment from being processed again.

There may be a case where a customer cancels the purchase of a part of the articles after he or she has placed the articles to be purchased. In this case, the electronic tag data attached to the canceled article has already been read by the electronic tag reader and sent to the article sales data processing apparatus. In this situation, a cashier performs the following actions.

Firstly, the cashier removes all the articles from the checkout counter. Then, the operator performs a key operation for clearing the memory area in which the article codes and serial numbers of the electronic tag data that have already been read are stored. Subsequently, the operator removes the canceled article from the communication area of the antenna and places the residual articles once again on the checkout counter to allow the electronic tag data of the articles to be read by the electronic tag reader.

BRIEF SUMMARY OF THE INVENTION

As described above, in the case where a customer cancels the purchase of a part of the articles after completion of the electronic tag data reading operation, it is necessary to perform the reading operation of the electronic tag data of the articles that the customer actually wants to purchase once again, which correspondingly decreases processing efficiency.

An object of the present invention is to increase processing efficiency in the case where a customer cancels the purchase of a part of the articles after completion of the electronic tag data reading operation.

An aspect of the present invention is as follows. An electronic tag data storage section that stores a plurality of electronic tag data and an article item storage section that stores a plurality of article sales data corresponding to one transaction are provided in an article sales data processing apparatus. The operating mode of the article sales data processing apparatus can be switched between an input mode and cancel mode. When electronic tag data is read from an electronic tag attached to an article by an electronic tag reader, it is determined whether the same data as the read electronic tag data is stored in the electronic tag data storage section. In the case where the same data is not stored, the read electronic tag data is added to the electronic tag data storage section. In the case where the same data is stored, the read electronic tag data is not added to the electronic tag data storage section. When the operating mode is switched from the input mode to cancel mode, electronic tag data in the electronic tag data storage section is cleared. When electronic tag data is added to the electronic tag data storage section in a state where the input mode is selected, article sales data is acquired based on the electronic tag data and added to an article item storage section. When electronic tag data is added to the electronic tag data storage section in a state where the cancel mode is selected, the article sales data acquired based on the electronic tag data is deleted from the article item storage section.

BRIEF DESCRIPTION OF THE SEVERAL VIEWS OF THE DRAWING

FIG. 3 is a view schematically showing the area configuration of an article item buffer provided in a RAM of the POS terminal according to the embodiment;

FIG. 4 is a view schematically showing the area configuration of an electronic tag data memory provided in the RAM of the POS terminal according to the embodiment;

DETAILED DESCRIPTION OF THE INVENTION

Figure 1:
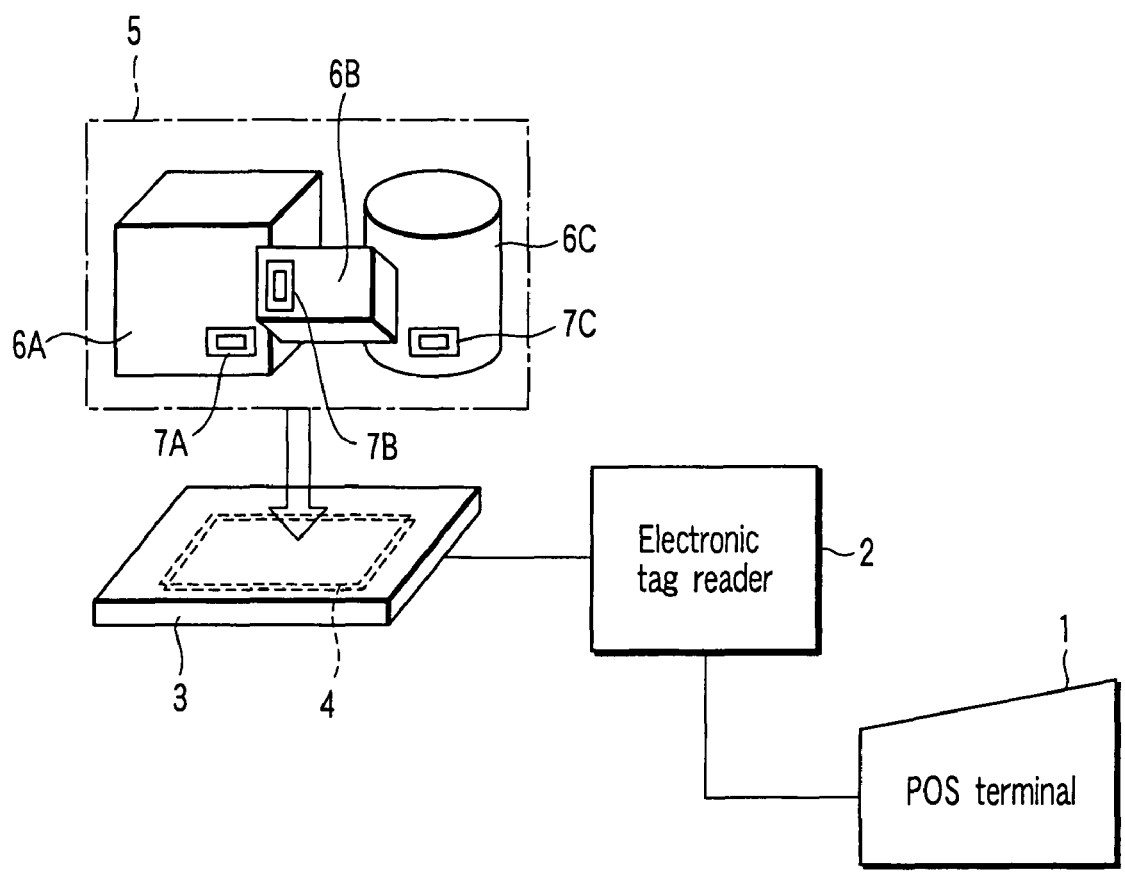
FIG. 1 is a system configuration diagram showing an embodiment of the present invention.

FIG. 1 is a view schematically showing an embodiment of an article sales data processing apparatus according to the present invention. This apparatus includes a point-of-sales (POS) terminal 1, an electronic tag reader 2, and a tag antenna plate 3. An antenna 4 for transmitting and receiving an electromagnetic field or electromagnetic wave with the electronic tag is attached to the tag antenna plate 3.

The electronic tag reader 2 communicates with an electronic tag existing within the communication range of the antenna 4 in a non-contact manner to read electronic tag data stored in a memory of the electronic tag. The electronic tag reader 2 has a collision prevention function called anti-collision system. With this function, when a plurality of articles 6A, 6B, 6C, . . . are placed on the tag antenna plate 3, data of electronic tags 7A, 7B, 7C, . . . respectively attached to the articles 6A, 6B, 6C, . . . are collectively read by the electronic tag reader 2. The articles 6A, 6B, 6C, . . . may or may not be put in a container 5 such as a shopping cart.

The electronic tag data read by the electronic tag reader 2 are sequentially transmitted to the POS terminal 1. The POS terminal 1 processes the sales data of the articles 6A, 6B, 6C, . . . based on the received electronic tag data.

The electronic tags 7A, 7B, 7C, . . . are referred to also as wireless tags, radio-frequency identification (RFID) tags, and IC tags. In the present embodiment, the electronic tags 7A, 7B, and 7C, . . . respectively attached to the articles 6A, 6B, 6C, . . . are article tags. The memory of the article tag stores at least a tag-specific identification code that is recorded in each tag at the time of manufacturing of the tag and an article code that is written for identifying the article to which the article tag is attached.

Figure 2:
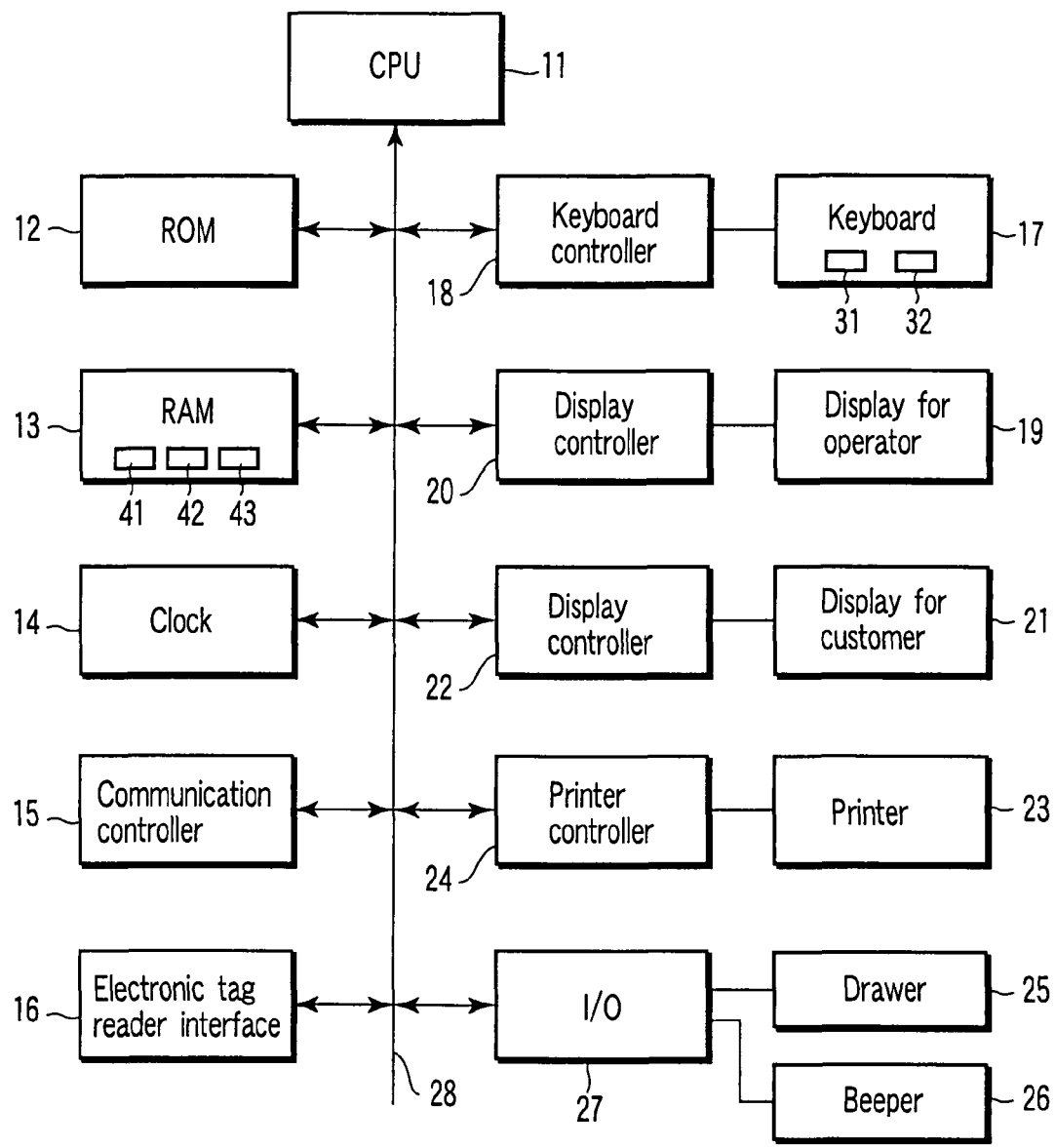
FIG. 2 is a block diagram showing a main configuration of a POS terminal according to the embodiment.

FIG. 2 is a block diagram showing a main configuration of the POS terminal 1 which is one aspect of the article sales data processing apparatus. The POS terminal 1 incorporates a central processing unit (CPU) 11 as a controller main body. In addition to the CPU 11, the POS terminal 1 includes a read-only memory (ROM) 12, a random access memory (RAM) 13, a clock 14, a communication controller 15, an electronic tag reader interface 16 to which the electronic tag reader 2 is connected, a keyboard controller 18 for controlling a keyboard 17, a first display controller 20 for controlling the screen display of a display 19 for operator, a second display controller 22 for controlling the screen display of a display 21 for customer, a printer controller 24 for controlling printing operation of a printer 23, and an input/output (I/O) port 27 for outputting drive signals to a drawer 25 and a beeper 26, respectively.

The CPU 11 connects to the ROM 12, RAM 13, clock 14, communication controller 15, electronic tag reader interface 16, I/O port 27, and controllers 18, 20, 22, 24 of the respective input/output devices through a bus line 28 such as an address bus or data bus.

Fixed data such as a program is previously stored in the ROM 12. Various memory areas for storing variable data such as input data and arithmetic processing data are formed in the RAM 13. The clock 14 provides the current date and time. A store server is connected online to the communication controller 15.

The keyboard 17 includes at least a transaction termination key 31 and a cancel key 32. The transaction termination key 31 is operated when termination of one transaction is declared. The transaction termination key 31 functions as a termination declaration means. The cancel key 32 is operated when cancellation of an article registered as an article to be sold in one transaction which is being processed, i.e., an article whose electronic tag data has been read is declared. The cancel key 32 functions as a cancel declaration means.

The RAM 13 includes at least an article item buffer 41, an electronic tag data memory 42, and a flag memory 43. The article item buffer 41 stores a plurality of article sales data to be processed as sales data in one transaction. The electronic tag data memory 42 stores a plurality of different electronic tag data. The flag memory 43 stores a cancel flag which is reset to "0" when an input mode is selected and which is set to "1" when a cancel mode is selected.

As shown in FIG. 3, the article item buffer 41 has an area for storing a plurality of article sales data each including items of article code, article name, unit price, number of sales, and sales amount, an area for storing the summation of the number of sales and that of the sales amount, and an area for storing cancel information. When the transaction termination key 31 is operated, the data stored in the article item buffer 41 is regarded as the data belonging to one transaction and processed collectively.

As shown in FIG. 4, the electronic tag data memory 42 has an area for storing electronic tag data in correspondence with area numbers of constant number N (N>1). The electronic tag data memory 42 stores the electronic tag data in the areas in the ascending order starting from area number 1. After the electronic tag data are stored in the areas up to area number N, subsequent electronic tag data are overwritten in the areas starting from area number 1.

Figure 5:
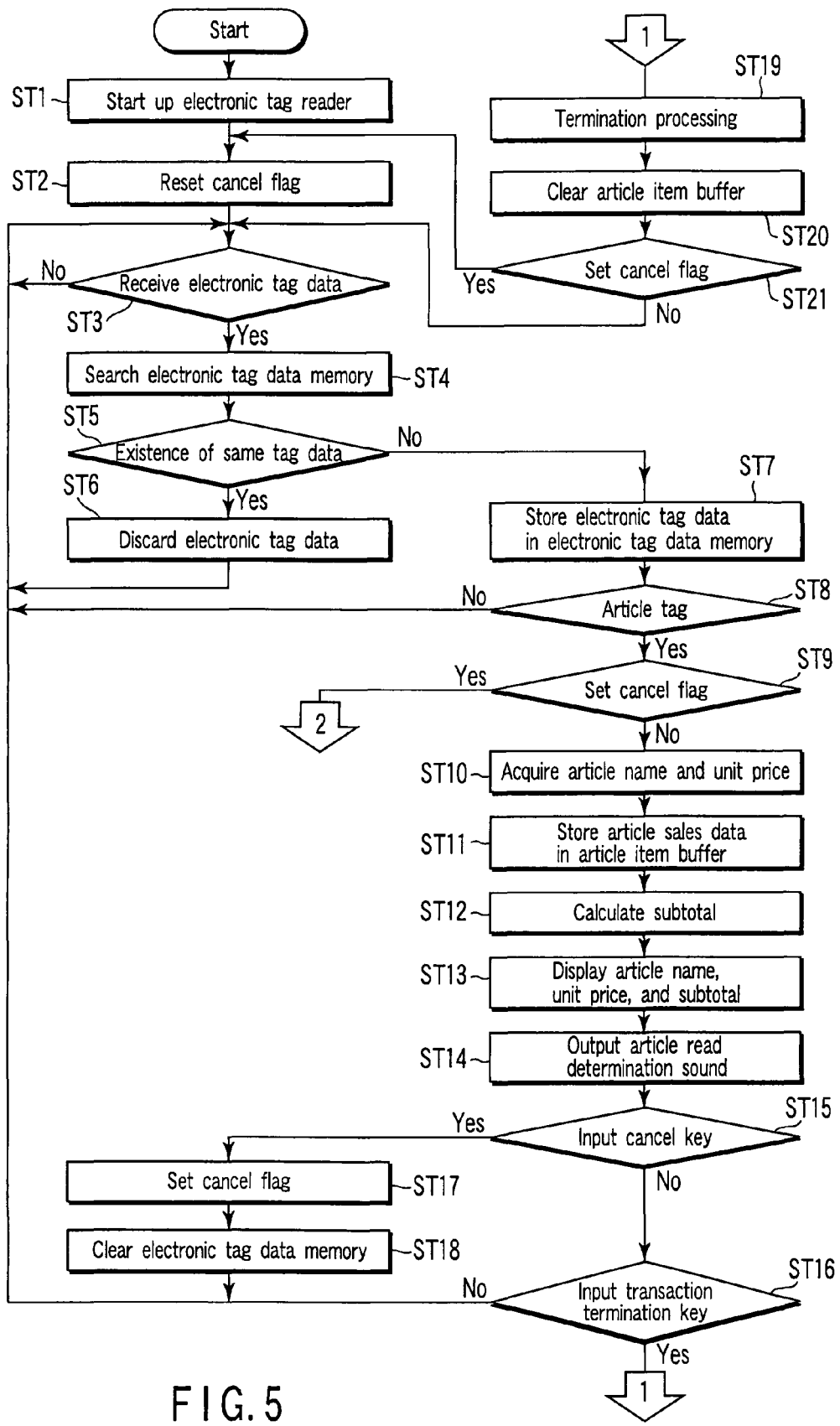
FIG. 5 is a flowchart showing a main procedure of control processing executed by a CPU of the POS terminal.
Figure 6:
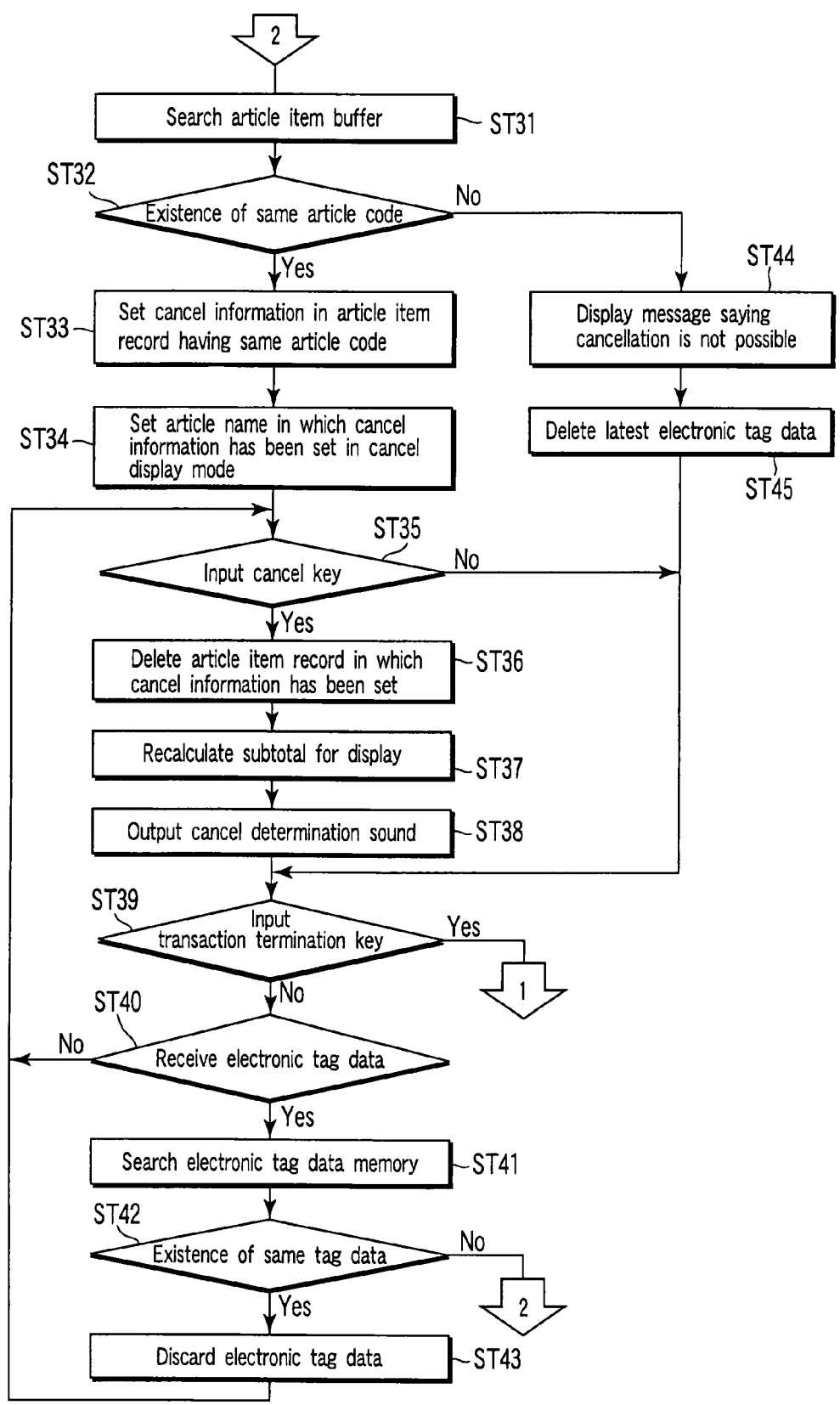
FIG. 6 is a flowchart showing a main procedure of control processing executed by a CPU of the POS terminal.

In the POS terminal 1 having the configuration described above, when a power is turned on and system is started up, the CPU 11 executes control processing according to the procedure shown in flowcharts of FIGS. 5 and 6. The CPU 11 instructs the electronic tag reader 2 to which the CPU 11 is connected through the electronic tag reader interface 16 to start up in step (ST) 1. In ST2, the CPU 11 resets the cancel flag to "0". That is, the CPU 11 sets the initial mode at the operation start time to the input mode.

Upon receiving the start-up instruction, the electronic tag reader 2 modulates a read signal for reading the electronic tag and continuously transmits the modulated electromagnetic wave from the antenna 4. Then, the electronic tag reader 2 waits for the antenna 4 to receive a response signal from the electronic tag. When receiving the response signal using the antenna 4, the electronic tag reader 2 demodulates the electromagnetic wave and transmits response data, i.e., electronic tag data stored in the memory of the electronic tag to the POS terminal 1.

In ST3, the CPU 11 waits for reception of the electronic tag data. Upon receiving the electronic tag data from the electronic tag reader 2, the CPU 11 searches the electronic tag data memory 42 in ST4. In ST5, the CPU 11 determines whether the same data as the received electronic tag data exists in the electronic tag data memory 42. More specifically, the CPU 11 searches the electronic tag data memory 42 using the tag-specified ID code included in the received electronic tag data. In the case where electronic tag data including the same ID code is found as a result of the search, the CPU 11 determines existence of the same data. In the case where electronic tag data including the same ID code is not found, the CPU 11 determines absence of the same data.

When determining existence of the same data, the CPU 11 does not add the received electronic tag data to the electronic tag data memory 42 but discards it in ST6. After an appropriate time, the CPU 11 returns to ST3 and waits for reception of the next electronic tag data.

On the other hand, when determining absence of the same data, the CPU 11 adds the received electronic tag data to the electronic tag data memory 42 in ST7.

By repeating the above steps ST4, ST5, ST6, and ST7, different electronic tag data are sequentially stored in the electronic tag data memory 42.

In ST8, the CPU 11 determines whether the electronic tag data added to the electronic tag data memory 42 is data of an article tag attached to each article or not. This determination is made based on whether or not the article code is included in the added electronic tag data. When the article code is not included, i.e., when the electronic tag data is not data of an article tag, the CPU 11 returns to ST3 and waits for reception of the next electronic tag data.

In the case where the received electronic tag data is data including the article code together with the ID code, this data is determined to be electronic tag data that has been read from the article tag, so the CPU 11 checks the cancel flag in ST9.

In the case where the cancel flag is "0", which means that the input mode has been selected, the CPU 11 acquires data such as article name and unit price based on the article code included in the received electronic tag data in ST10.

The POS terminal 1 has an article data file in which the article data such as the article name and unit price has been preset in correspondence with the article code of each article. Upon acquisition of the article code from the electronic tag data, the CPU 11 searches the article data file using the acquired article code. Then, the CPU 11 acquires the article data such as article name and unit price that has been set in correspondence with the article code. Note that by storing the article data such as the article name and unit price in the memory of the article tag together with the article code, it is possible to omit the article data file.

Upon acquisition of the article data such as the article code, article name, and unit price, the CPU 11 generates article sales data including the article code, article name, unit price, number of sales, and sales amount in ST11. In the article sales data, the number of sales is fixed to "1". Accordingly, the unit price directly represents the sales amount. The CPU 11 adds the article sales data to the article item buffer 41.

In ST12, the CPU 11 adds the number of sales and sales amounts of respective article sales data stored in the article item buffer 41 to calculate the total number of sales and total sales amounts (subtotal) and rewrites the summation area of the article item buffer 41.

In ST13, the CPU 11 displays the article name, unit price, subtotal, and the like on the display 19 for operator and display 21 for customer. Further, in ST14, the CPU 11 sends a drive signal to the beeper 26 to cause an article read determination sound to be emitted.

The CPU 11 then determines in ST15 whether or not the cancel key 32 has been operated. In the case where the cancel key 32 has not been operated, the CPU 11 determines in ST16 whether or not the transaction termination key 31 has been operated. In the case where also the transaction termination key 31 has not been operated, the CPU 11 returns to ST3 and waits for reception of the next electronic tag data.

In the case where the cancel key 32 has been operated, which means that switching from the input mode to cancel mode is instructed, the CPU 11 sets the cancel flag to "1" in ST17. In ST18, the CPU 11 clears all the electronic tag data in the electronic tag data memory 42 in ST18. Thereafter, the CPU 11 returns to ST3 and waits for reception of the next electronic tag data.

In the case where the transaction termination key 31 has been operated, the CPU 11 performs termination processing of one transaction based on the article sales data stored in the article item buffer 41 in ST19. The termination processing includes processing of calculating change upon payment for the total amount in one transaction, processing of displaying the amount of change on the display 19 for operator and display 21 for customer, and processing of automatically opening the drawer 25. In addition to the above, the termination processing includes processing of driving the printer 23 to issue a receipt on which transaction detail data stored in the article item buffer 41, such as the article name, number of sales, sales amount, total number of sales, total sales amounts, has been printed.

After completion of the termination processing, the CPU 11 clears all the article sales data in the article item buffer 41 in ST20. At this time, the CPU 11 does not clear the electronic tag data in the electronic tag data memory 42.

After an appropriate time, the CPU 11 checks the cancel flag in ST21. Since the cancel flag is "0" at this time, the CPU 11 advances to ST3 and waits for reception of the next electronic tag data.

In the case where the cancel flag is set to "1" in ST9, the data of the article tag are read in the cancel mode and the CPU 11 advances to the processing shown in a flowchart of FIG. 6. That is, in ST31, the CPU 11 searches the article item buffer 41 using an article code included in the read electronic tag data as a search key. In the case where a record (article sales data) having the same article code as the search key is found, the CPU 11 sets cancel information (e.g., 11) in the record in ST33. Further, in ST34, the CPU 11 sets the article name of the record displayed on the display 19 for operator and display 21 for customer in a cancel display mode. For example, the article name is highlighted, or double cancel lines are superimposed on the article name. The cancel display method is not limited to this, and any method can be used as long as it allows the operator to grasp that the article is a canceled one.

Then, in ST35, the CPU 11 determines whether or not the cancel key 32 has been operated once again. In the case where the cancel key 32 has not been operated, the CPU 11 determines in ST39 whether or not the transaction termination key 31 has been operated. In the case where also the transaction termination key 31 has not been operated, the CPU 11 waits for reception of the next electronic tag data in ST40.

When receiving the next electronic tag data, the CPU 11 searches the electronic tag data memory 42 in ST41. Then, the CPU 11 determines whether or not the same data as the received electronic tag data has been stored in the electronic tag data memory 42. When determining existence of the same data, the CPU 11 does not add the received electronic tag data to the electronic tag data memory 42 but discards it in ST43. After an appropriate time, the CPU 11 returns to ST35 and waits for the operation of the cancel key 32, operation of the transaction termination key 31, or reception of the next electronic tag data.

On the other hand, when determining absence of the same data, the CPU 11 returns to ST31. That is, in ST31, the CPU 11 searches the article item buffer 41 using the article code including in the received electronic tag data as a search key. In the case where a record having the same article code as the search key is found, the CPU 11 sets cancel information in the record. Further, the CPU 11 sets the article name of the record displayed on the display 19 for operator and display 21 for customer in a cancel display mode.

In the case where the operation of the cancel key 32 has been detected in ST35, which means that confirmation operation of the cancellation of the article has been made, the CPU 11 performs cancel processing of the record in which the cancel information has been set among all the records stored in the article item buffer 41 in ST36. After an appropriate time, the CPU 11 recalculates the total number of sales and total sales amounts (subtotal) based on the number of sales and sales amount of each article sales data stored in the article item buffer 41 to overwrite the summation area of the article item buffer 41. Then, the CPU 11 displays the subtotal on the display 19 for operator and display 21 for customer. Further, in ST38, the CPU 11 sends a drive signal to the beeper 26 to cause a cancel determination sound to be emitted. The tone of the cancel determination sound is different from that of the article read determination sound. Thereafter, the CPU 11 waits for the operation of the transaction termination key 31 or reception of the next electronic tag data.

In the case where a record having the same article code as the article code used as the search key is not found in ST32, the CPU 11 displays a message saying cancellation is not possible only on the display 19 for operator in ST44. Further, in ST45, the CPU 11 deletes the latest electronic tag data from the electronic tag data memory 42. Thereafter, the CPU 11 waits for the operation of the transaction termination key 31 or reception of the next electronic tag data.

In the case where the transaction termination key 31 has been operated in ST39, the CPU 11 advances to ST19 in FIG. 5. That is, the CPU 11 performs the termination processing of one transaction based on the article sales data stored in the article item buffer 41. After completion of the transaction termination processing, the CPU 11 clears the article sales data in the article item buffer 41. After an appropriate time, the CPU 11 checks the cancel flag. Since the cancel flag is set to "1" at this time, the CPU 11 returns to ST2 and resets the cancel flag to "0", that is, operating mode is switched from the cancel mode to input mode. Thereafter, the CPU 11 advances to ST3 and waits for reception of the next electronic tag data.

As described above, in the present embodiment, when a power of the POS terminal 1 is tuned on, a read signal for reading the electronic tag is continuously transmitted from the antenna 4 of the electronic tag reader 2. In a general state, the cancel flag is reset to "0", that is, the input mode is selected as the operating mode.

When an electronic tag enters the communication range of the antenna 4, electronic tag data stored in the memory of the electronic tag is read by the electronic tag reader 2 in a non-contact manner and transmitted to the POS terminal 1.

Assume that a customer comes to a checkout counter on which the POS terminal 1 is installed for the purpose of purchasing ten articles of 6A, 6B, 6C, . . . . In this case, a cashier places the articles 6A, 6B, 6C, . . . on the tag antenna plate 3. Then, electronic tags 7A, 7B, 7C, attached to the articles 6A, 6B, 6C, . . . transmit response signals carrying the electronic tag data each including ID code and article code in response to a read signal from the antenna 4.

Assume that the response signal from the electronic tag 7A attached to the article 6A has been received by the antenna 4. Then, the electronic tag data including the ID code and article code stored in the electronic tag 7A is read by the electronic tag reader and transmitted to the POS terminal 1.

Then, the POS terminal 1 determines whether or not electronic tag data including the ID code in the received electronic tag data has been stored in the electronic tag data memory 42. It is determined to be "No" in this case, so that this electronic tag data is added to the electronic tag data memory 42. Further, based on the article code in the electronic tag data, the article name and unit price of the article A are acquired and article sales data is then generated. The generated article sales data is stored in the article item buffer 41. Note that data in the article item buffer 41 has been cleared after the transaction termination processing of an immediately preceding customer.

Next, assume that the response signal from the electronic tag 7B attached to the article 6B is received by the antenna 4. In this case, the electronic tag data including the ID code and article code stored in the electronic tag 7B is read by the electronic tag reader and transmitted to the POS terminal 1.

The POS terminal 1 then determines whether or not electronic tag data including the ID code in the received electronic tag data has been stored in the electronic tag data memory 42.

It is determined to be "No" also in this case, so that this electronic tag data is added to the electronic tag data memory 42. Further, based on the article code in the electronic tag data, the article name and unit price of the article B are acquired and article sales data is then generated. The generated article sales data is stored in the article item buffer 41.

The same processing is performed in the case where response signals from the electronic tags 7C, . . . attached to the following eight articles 6C, . . . are received by the antenna 4. Note that in the case where the response signal from the electronic tag 7B is received again before the response signal from the electronic tag 7C is received, the electronic tag data of the electronic tag 7B is discarded since the ID code stored in the electronic tag 7B has already been stored in the electronic tag data memory 42.

Thereafter, the cashier operates the transaction termination key 31 to perform transaction termination processing based on the respective article sales data of articles 6A, 6B, 6C, . . . stored in the article item buffer 41. After completion of the transaction termination processing, the data in the article item buffer 41 is cleared. This enables accounting for the next customer.

However, at this time, data in the electronic tag data memory 42 is not cleared. This means that the electronic tag data of the electronic tags 7A, 7B, 7C, . . . attached to the articles 6A, 6B, 6C, . . . are kept remained in the electronic tag data memory 42. Therefore, even if the purchased article of an immediately preceding customer is situated near the electronic tag reader 2 and therefore the data of the electronic tag attached to the purchased article is read again, the read electronic tag data is not added to the electronic tag data memory 42. Naturally, the article sales data of the articles 6A, 6B, 6C, . . . to which the electronic tags 7A, 7B, 7C, . . . whose data have been stored in the electronic tag data memory 42 are attached are not stored in the article item buffer 41.

That is, reregistration of the purchased article of an immediately preceding customer is inhibited by a duplicate reading prevention function using the data of the electronic tag data memory 42. Therefore, accounting for the next customer can smoothly be performed. Further, it is possible to eliminate the need to provide a special technical means for determining whether or not the article after payment is situated apart from the electronic tag reader by a predetermined distance, thereby realizing the system according to the present invention at low cost.

In the present embodiment, the cancel key 32 is provided in the keyboard 17. When the cancel key 32 is operated, the cancel flag is set to "1" to switch the operating mode to the cancel mode and clear data in the electronic tag data memory 42. However, at this time, article sales data stored in the article item buffer 41 is not cleared.

Assume that a customer requests cancellation of the purchase of a part of his articles, e.g., the article 6C before the transaction termination key 31 is operated. In this case, a cashier operates the cancel key 32 after removing all the articles 6A, 6B, 6C, . . . from the tag antenna plate 3. Then, all the electronic tag data in the electronic tag data memory 42 are cleared.

Subsequently, the cashier picks up the canceled article 6C from the 10 articles removed from the tag antenna plate 3 and places the article 6C on the tag antenna plate 3. Then, the electronic tag data of the electronic tag 7C attached to the article 6C is read by the electronic tag reader 2. Since this electronic tag data does not exist in the electronic tag data memory 42 at this time, it is newly stored in the electronic tag data memory 42. Further, based on the electronic tag data, cancel information is added to the article sales data of the article 6C stored in the article item buffer 41. Then, the article name of the article 6C displayed on the display 19 for operator and display 21 for customer is set in a cancel display mode.

After confirming the cancel display mode of the article 6C, the cashier operates the cancel key 32 once again. Then, the article sales data of the article 6C is deleted from the article item buffer 41. Further, the subtotal of the purchased 9 articles (obtained as a result of excluding the article 6C from the 10 articles 6A, 6B, 6C, . . . ) is displayed on the display 19 for operator and display 21 for customer. Thereafter, when the cashier operates the transaction termination key 31, the transaction termination processing is performed based on the article sales data of 9 articles 6A, 6B, 6D, . . . stored in the article item buffer 41.

As described above, in the case where a customer requests cancellation of the purchase of a part of articles after he has placed his articles on the tag antenna plate 3 of the checkout counter, only the article to be cancelled is placed on the tag antenna plate 3 for rereading operation after all the articles are removed from the tag antenna plate 3. That is, it is not necessary to place all the articles except the article to be cancelled on the tag antenna plate 3 for rereading operation unlike a conventional technique.

The electronic tag data is read, one by one, in the chronological order. Therefore, the number of processing steps of the POS terminal 1 is reduced as the number of articles to be reread becomes smaller. Even if there is a request of the cancellation, the number of articles to be cancelled is one or two, in most cases. Thus, according to the present embodiment, the processing efficiency can significantly be increased as compared to a conventional technique.

There is known an article sales data processing apparatus having a configuration in which the article code is input one by one based on reading operation of a barcode. In this type of apparatus, operation of "Undo" key is effective for cancellation of the article input immediately before the newest. However, in the case where the article other than one input immediately before the newest is cancelled, it is necessary to operate "specify/cancel key" and perform input operation of a barcode specifying the article to be cancelled. This is a troublesome work.

On the other hand, in the present embodiment, the above-mentioned simple operation suffices to effectively perform the cancellation operation. This operation is easy to learn, so that an inexperienced cashier (e.g., part-time cashier) can conduct the operation without mistakes.

In the above embodiment, electronic tag data memory 42 is searched using the tag-specified ID code included in the received electronic tag data to thereby determine presence/absence of the electronic tag data including the same ID code. On the other hand, there is a case where a third tag that does not store the tag-specified ID code but stores a pair of the article name and serial number is attached to each article. In order to cope with such a case, it is only necessary to use the article code and serial number in place of the tag-specified ID code. In this case, a pair of the article code and serial number included in the electronic tag data received by the electronic tag reader 2 is stored in the electronic tag data memory 42, and the electronic tag data memory 42 is searched to determine presence/absence of the electronic tag data including the same article code and serial number.

Further, in the above embodiment, an article tag storing the article code in addition to the tag-specified ID code is attached to each article, and sales data of each article is acquired from an article data file in which article data such as article name and unit price has been preset in correspondence with the article code stored in each article tag. On the other hand, there is a case where an RFID tag capable of reading only the tag-specified ID code is attached to each article. In such a case, an article data file in which article data such as article code, article name, and unit price has been preset in correspondence with the tag-specified ID code is prepared, and sales data of each article is acquired from this file based on the ID code.

Further, in the above embodiment, the electronic tag data memory 42 is provided in the RAM 13 of the POS terminal. Alternatively, however, the electronic tag data memory 42 may be provided in the memory of the electronic tag reader 2. In this case, the duplicate reading of the electronic tag data is prevented on the electronic tag reader 2 side.

Further, in the above embodiment, the cancel key 32 is used as a key for instructing switching the operation mode from the input mode to cancel mode and used also as a key for confirming the canceled article. Alternatively, however, the above switching function and confirmation function may separately be set in different keys. Further, when a configuration in which the article sales data is deleted regardless of input of the confirmation key is adopted, it is possible to omit the confirmation key.

The present invention can suitably be applied to a system using an electronic tag attached to each article to perform checkout of articles that a customer purchases based on data stored in the electronic tag.

What is claimed is:

1. An article sales data processing apparatus comprising:
   a tag antenna plate that receives signals transmitted from electronic tags associated with a plurality of articles;
   an electronic tag reader that reads electronic tag data stored in each of said electronic tags existing within a communication range of the tag antenna plate, through the signals transmitted from said plurality of electronic tags;
   an electronic tag data storage section that stores electronic tag data read by the electronic tag reader;
   an article item storage section that stores article sales data;
   determination means for determining whether the same data as electronic tag data read from the electronic tag using the electronic tag reader is stored in the electronic tag data storage section;
   electronic tag data processing means for adding the electronic tag data read from the electronic tag to the electronic tag data storage section in the case where the determination means determines that the same data is not stored, while not adding the electronic tag data read from the electronic tag to the electronic tag data storage section in the case where the determination means determines that the same data is stored;
   mode switching means for switching an operating mode between an input mode and a cancel mode;
   article sales data addition means for adding, when electronic tag data is added to the electronic tag data storage section by the electronic tag data processing means in a state where the input mode is selected, the article sales data acquired based on the electronic tag data to the article item storage section;
   electronic tag data clear means for clearing all electronic tag data stored in the electronic tag data storage section and not clearing article sales data stored in the article item storage section when the operating mode is switched from the input mode to cancel mode before termination of one transaction;
   article sales data cancel means for deleting the article sales data acquired from electronic tag data from the article item storage section when the electronic tag data is added to the electronic tag data storage section by the electronic tag data processing means in a state where the cancel mode is selected;
   transaction termination processing means for performing termination processing of one transaction based on the article sales data stored in the article item storage section when the termination of that one transaction is declared; and
   article sales data clear means for clearing the article sales data stored in the article item storage section after the transaction termination processing is performed by the transaction termination processing means while the data in the electronic tag data storage section is maintained.

2. The article sales data processing apparatus according to claim 1, wherein
   the article sales data cancel means displays the article sales data acquired from the electronic tag data added to the electronic tag data storage section by the electronic tag data processing means and deletes the acquired article sale data from the article item storage section after confirmation operation is made.

3. The article sales data processing apparatus according to claim 1, comprising cancel declaration means for declaring the cancellation of an article, wherein
   the initial operating mode is set to the input mode, and
   the mode switching means switches the operating mode to the cancel mode when the cancel declaration means declares the cancellation of an article and switches back the operating mode to the input mode when the transaction termination declaration means declares the termination of one transaction.

4. The article sales data processing apparatus according to claim 1, wherein while the cancel mode is selected, if it is detected that the article sales data acquired from the electronic tag data stored in the electronic tag data storage section is not stored in the article item storage section, a display section displays a message saying cancellation is not possible.

* * * * *